United States Patent [19]

Kim

[11] Patent Number: 5,781,503
[45] Date of Patent: Jul. 14, 1998

[54] METHOD FOR ATTENUATING SURFACE WAVETRAINS IN SEISMIC DATA

[75] Inventor: Young C. Kim, Houston, Tex.

[73] Assignee: Exxon Production Research Company, Houston, Tex.

[21] Appl. No.: 790,947

[22] Filed: Jan. 29, 1997

[51] Int. Cl.$^6$ .............................. G01V 1/28; G01V 1/36
[52] U.S. Cl. ................. 367/45; 367/48; 367/49; 367/74; 364/421
[58] Field of Search .................. 367/45, 48, 49, 367/74; 364/421

[56] References Cited

U.S. PATENT DOCUMENTS

| | | | |
|---|---|---|---|
| 5,060,202 | 10/1991 | Meek et al. | 367/45 |
| 5,237,538 | 8/1993 | Linville et al. | 367/46 |

OTHER PUBLICATIONS

"Whatever happened to ground roll?"; N. A. Anstey; Geophysics: The Leading Edge of Exploration, Mar. 1986, pp. 40–45.

"3-D prestack f-x coherent noise suppression"; James E. Gaiser; 65th Annual Int. Mtg. Soc. Expl. Geophys., 1995, pp. 1354–1357.

"Groundroll: Rejection using adaptive phase–matched filters"; R. B. Hermann, D.R. Russell; Geophysics, vol. 55, pp. 776–781, 1990.

"Removing Coherent Noise in Seismic Data through T-K or F-X Filtering"; Meek, Linville, 63rd Ann., Intl. Mtg. SEG, 1993, pp. 1177–1180.

"A method of ground-roll elimination"; R. Saatcilar & N. Canitez; Geophysics 53; pp. 894–902, 1988.

*Primary Examiner*—Nelson Moskowitz
*Attorney, Agent, or Firm*—Keith A. Bell

[57] ABSTRACT

A method for attenuating source-generated surface wavetrains in a set of seismic data traces. According to the method, the seismic data traces are Fourier transformed with respect to time to determine the frequency components of the surface wavetrain. A phase matching operation is then performed using estimates of the wavenumbers for each of the frequency components to approximately align the surface wavetrain in the seismic data traces. Next, a spatial low-pass filter is used to remove the approximately aligned surface wavetrain. Finally, the phase matching is removed and an inverse Fourier transformation is performed to return the seismic data traces to the time domain.

7 Claims, 3 Drawing Sheets

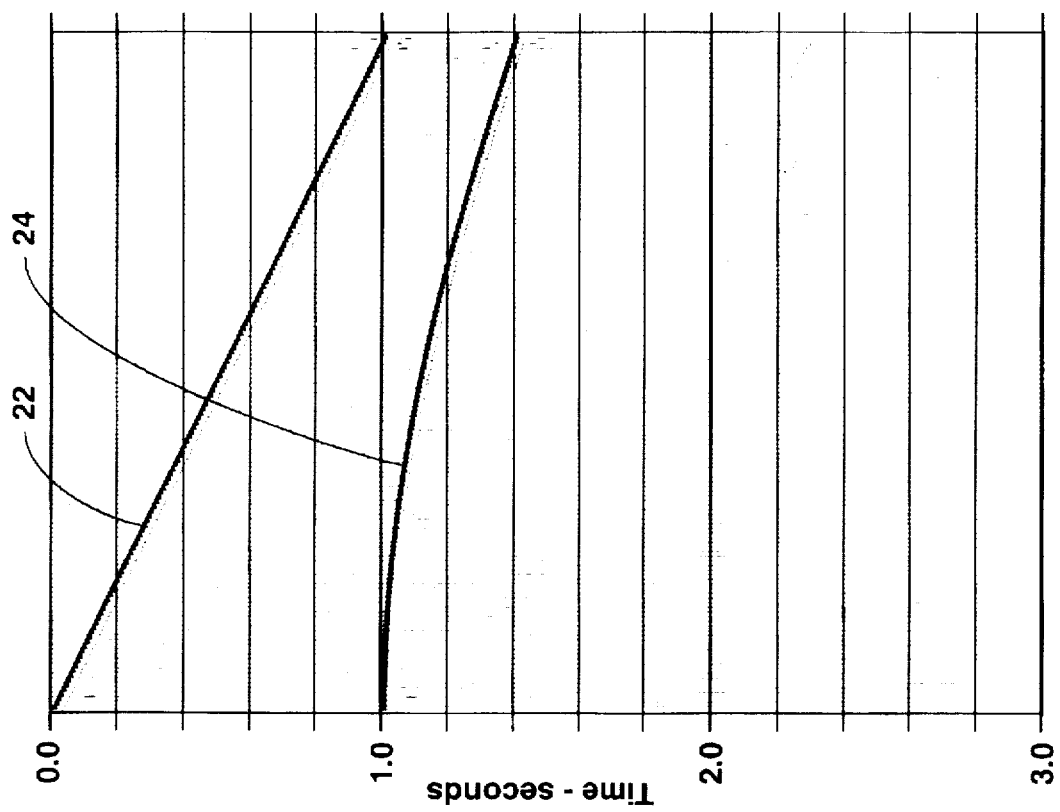
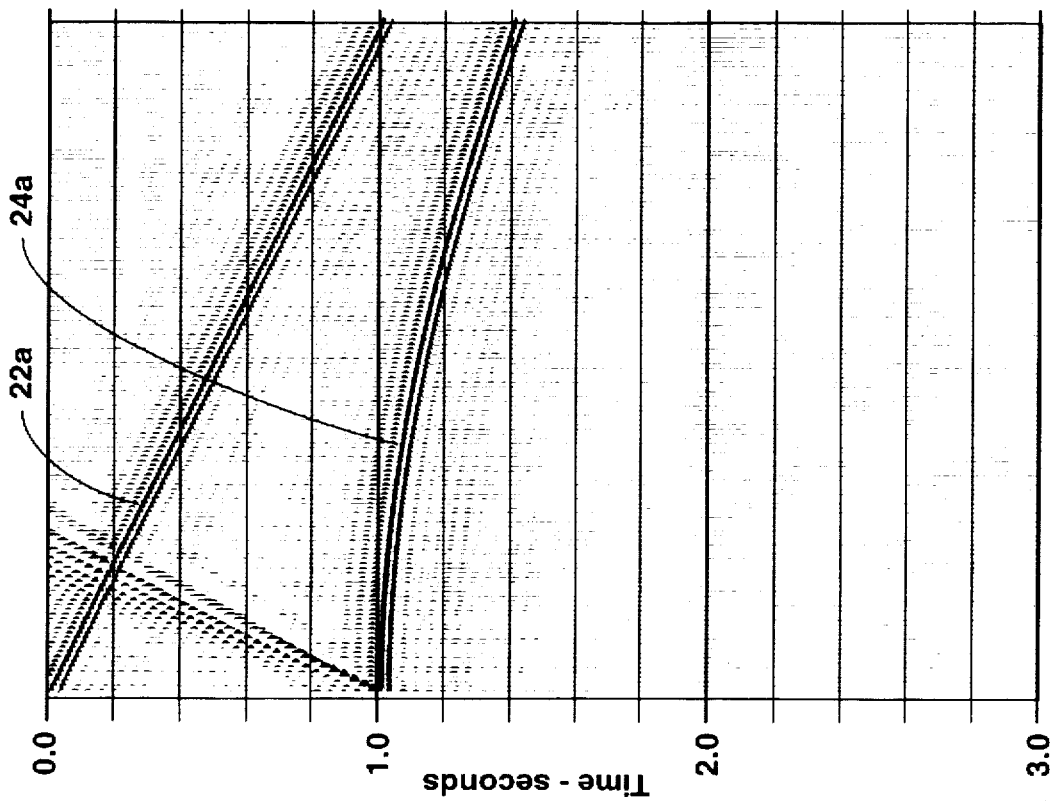
FIG. 5
FIG. 4

1

METHOD FOR ATTENUATING SURFACE WAVETRAINS IN SEISMIC DATA

FIELD OF THE INVENTION

This invention relates generally to the field of seismic prospecting and, more particularly, to seismic data processing. Specifically, the invention is a method for using a modified phase-matched filter to attenuate source-generated surface wavetrains in seismic data.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a seismic signal which propagates into the earth and is at least partially reflected by subsurface seismic reflectors (i.e., interfaces between underground formations having different elastic properties). The reflected signals (known as "seismic reflections") are detected and recorded by seismic receivers located at or near the surface of the earth, in an overlying body of water, or at known depths in boreholes, and the resulting seismic data may be processed to yield information relating to the subsurface formations.

Seismic prospecting consists of three separate stages: data acquisition, data processing, and data interpretation. The success of a seismic prospecting operation depends on satisfactory completion of all three stages.

The seismic energy recorded by each seismic receiver during the data acquisition stage is known as a "seismic data trace." Seismic data traces typically contain both the desired seismic reflections and one or more unwanted noise components which can obscure or overwhelm the seismic reflections. One of the primary objectives of the data processing stage is to remove or at least attenuate these unwanted noise components so that the desired seismic reflections can be clearly identified and interpreted.

Many different types of noise, both random and coherent, may be contained in a seismic data trace. Random noise is seismic energy which does not correlate between distinct seismic data traces. Coherent noise, on the other hand, is noise which has a systematic correlation between adjacent seismic data traces. As is well known in the art, random noise and, in many cases, coherent noise may be attenuated through the stacking process.

One type of coherent noise which may be contained in a seismic data trace is source-generated surface wavetrains, such as ground roll or ice-flexural waves. These source-generated surface wavetrains are recorded in seismic data traces as high-amplitude, low-frequency dispersive wavetrains. As is well know to persons skilled in the art, dispersive wavetrains are those in which each frequency component travels at a different velocity. A dispersive wavetrain is characterized by a "dispersion relation" which is the relationship between wavenumber and frequency for the wavetrain. As used herein, the "wavenumber" of a wavetrain is $2\pi$ times the number of cycles per unit distance measured perpendicular to the wavefront.

Because the seismic velocities of source-generated surface wavetrains are typically much slower than those of the desired seismic reflections, the stacking process often can be used to suppress surface wavetrains in stacked data. However, there is a need for a method to attenuate surface wavetrains in prestack data so that more accurate estimates of seismic velocities and static corrections can be obtained.

2

Accurate estimates of seismic velocities and static corrections are critical to obtaining high-quality images of the subsurface.

High-pass filters (i.e., filters that pass frequencies above some cutoff frequency without significant attenuation, while attenuating lower frequencies) can sometimes be used to remove surface wavetrains from prestack seismic data traces. High-pass filtering is effective as long as the frequencies of the surface wavetrains do not overlap with those of the desired seismic reflections. If the frequencies are overlapped, however, high-pass filtering also suppresses the low-frequency components of the seismic reflections, resulting in the loss of valuable data.

Frequency-wavenumber (f-k) filtering is another approach which can sometimes be used to remove surface wavetrains from prestack seismic data. However, since surface wavetrains are typically very slow, some of their wavelengths may be smaller than a typical station spacing, resulting in spatial aliasing in the f-k domain. This spatial aliasing makes f-k filtering less effective. Furthermore, three-dimensional (3-D) seismic data, especially 3-D land seismic data, are usually not amenable to Fourier transform techniques, such as f-k filtering, which require uniform sampling intervals.

Phase-matched filtering may be used to attenuate surface wavetrains in prestack seismic data traces by compressing and separating them from the desired seismic reflections.

DETAILED DESCRIPTION OF THE PREFERRED EMBODIMENTS

The present invention is a method for attenuating a source-generated, dispersive surface wavetrain, even if there are multiple modes, in a set of prestack seismic data traces. The inventive method exploits the fact that the propagation velocity of the surface wavetrain is generally much lower than that of the desired seismic reflections to separate and remove the surface wavetrain from the seismic data traces.

The inventive method is preferably performed on a suitably programmed digital computer. Persons of ordinary skill in the art of seismic data processing could easily develop computer software for performing the method based on the teachings set forth herein.

FIG. 1 is a flow diagram for one embodiment of the inventive method. At step 10, the seismic data traces are Fourier transformed with respect to time to determine the frequency components of the seismic data traces. Next, at step 12, the wavenumber for each frequency component of the surface wavetrain is estimated, as more fully described below. At step 14, the wavenumber estimates are used to perform a phase matching operation to approximately align the surface wavetrain in the seismic data traces. A spatial low-pass filter is then applied, at step 16, to remove the approximately aligned surface wavetrain. Finally, at steps 18 and 20, the phase matching is removed and an inverse Fourier transformation is performed to return the seismic data traces to the time domain. The result of this process is a set of seismic data traces from which the source-generated surface wavetrain has been removed or at least substantially attenuated.

The wavenumber estimates used in step 12 may be obtained in any conventional manner, such as from the slopes of the surface wavetrain in a shot record or from the f-k diagram of a shot record. The wavenumbers used in the present method need not be precise; approximate estimates of the wavenumbers will suffice.

The mathematical basis for the present invention will now be described. A Fourier transformation of a seismic data trace containing both a dispersive surface wavetrain and other wavetrains can be expressed as a sum of wavetrains, $$S(x,f) = A_s(f)e^{-jk_s(f)x} + \sum_m A_m(f)e^{-jk_m(f)x}, \qquad (1)$$

seismic data traces, and (f) performing an inverse Fourier transformation to return the seismic data traces to the time domain. The wavenumber estimates for the surface wavetrain may be obtained in any conventional manner, such as from the slopes of the source-generated surface wavetrain in a common-source gather of the prestack seismic data traces (each frequency component of a dispersive wavetrain has a different slope) or from the f-k diagram of a common-source gather of the prestack seismic data traces.

BRIEF DESCRIPTION OF THE DRAWINGS

The present invention and its advantages will be better understood by referring to the following detailed description and the attached drawings in which:

FIGS. 2 through 5 illustrate application of the inventive method to a model data set;

FIG. 2 is a time domain representation of the original data set which contains a linear direct arrival, a hyperbolic seismic reflection, and a dispersive wavetrain;

FIG. 3 is a time domain representation of the result of phase matching in the frequency domain with the correct dispersion relation;

FIG. 4 is a time domain representation of the result after the removal of the phase-matched surface wavetrain using a spatial low-pass filter; and FIG. 5 is a time domain representation of the final results after removal of the phase matching.

Figure 1:
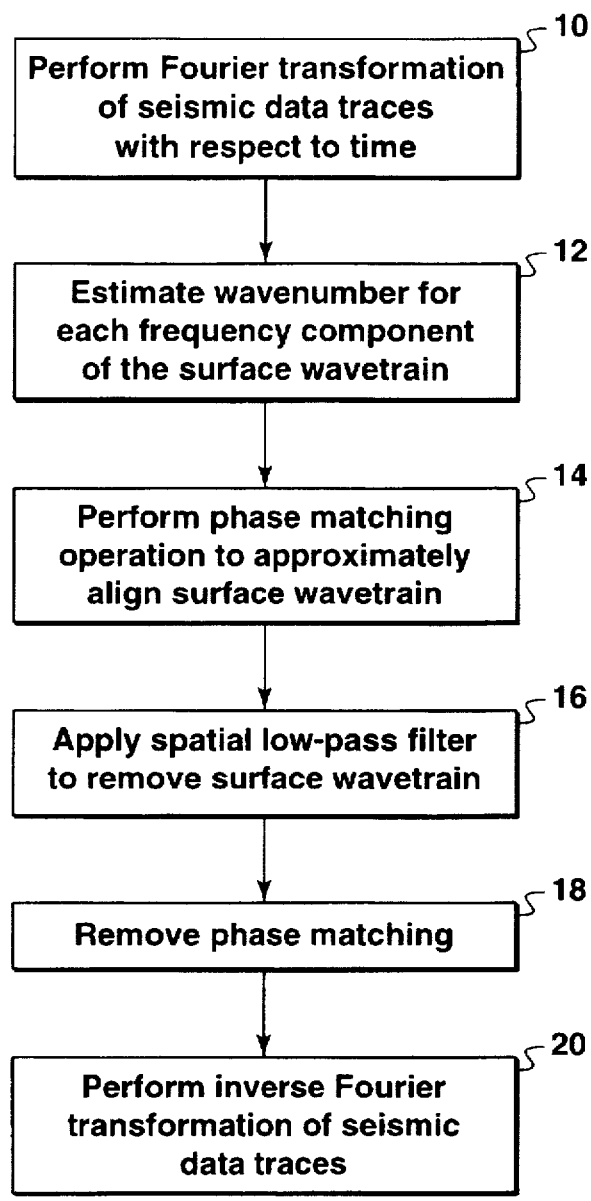
FIG. 1 is a flow chart showing the primary steps of one embodiment of the present invention.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which may be included within the spirit and scope of the invention, as defined by the appended claims. Phase-matched filtering applies phase matching to a trace using the dispersion relation of the surface wavetrain so that the effects of propagation from the source location to each receiver location are removed. As a result of the phase matching, the surface wavetrain in each seismic data trace is compressed and shifted to the time origin. The compressed and shifted surface wavetrain can then be removed by zeroing the data samples in a small window at the time origin.

However, conventional phase-matched filtering techniques are often ineffective for the suppression of source-generated surface wavetrains in seismic data. For example, ground roll is often continuously generated after the shot is activated or is later generated by air blasts from the shot. For these types of ground roll, phase matching cannot shift the compressed wavetrain to the time origin unless the exact time when the ground roll was generated is known. Moreover, seismic reflections overlapping in time with surface wavetrains will be shifted to the time origin together with the surface wavetrains. Zeroing data samples in a small window will also remove these desired seismic reflections. In addition, adaptive iteration, which is used to determine the dispersion relation for conventional phase-matched filtering, may fail to converge if there are multiple modes of surface wavetrains.

Accordingly, there is a need for a reliable method for removing or attenuating ground roll and other source-generated surface wavetrains in prestack seismic data, which method is not subject to the problems of prior art methods described above. The present invention satisfies this need.

SUMMARY OF THE INVENTION

In one embodiment, the invention is a method for attenuating a source-generated surface wavetrain in a set of common-source prestack seismic data traces which comprises the steps of (a) performing a Fourier transformation of the seismic data traces with respect to time to determine the frequency components of the surface wavetrain, (b) estimating the wavenumber for each of the frequency components of the surface wavetrain, (c) using the wavenumber estimates to perform a phase-matching operation to approximately align the surface wavetrain in the seismic data traces, (d) applying a spatial low-pass filter to remove the approximately aligned surface wavetrain, (e) removing the phase-matching from the where $S(x,f)$ is the Fourier transform with respect to time of a seismic data trace recorded by a seismic receiver at x;

f denotes frequency;

$A_s(f)$ is the amplitude of the surface wavetrain at frequency f;

$A_m(f)$ is the amplitude of the mth other wavetrain at frequency f;

j equals $\sqrt{-1}$;

$k_s(f)$ is the wavenumber of the surface wavetrain at frequency f; and $k_m(f)$ is the wavenumber of the mth other wavetrain at frequency f.

In equation (1), the first term (the "$A_s$" term) represents the surface wavetrain with dispersion relation $k_s(f)$, i.e., a functional dependence of wavenumber on frequency, and the second term (the "$A_m$" summation) represents all other wavetrains in the seismic data trace.

Phase matching (step 14 in FIG. 1) is performed with an estimated wavenumber, $\hat{k}_s(f)$, by multiplying equation (1) by $\exp(j\hat{k}_s(f)x)$, i.e., $$S(x,f)e^{j\hat{k}_s(f)x} = A_s(f)e^{-j(k_s(f)-\hat{k}_s(f))x} + \sum_m A_m(f)e^{-j(k_m(f)-\hat{k}_s(f))x}, \qquad (2)$$

where $\hat{k}_s(f)$ is the estimated wavenumber of the surface wavetrain at frequency f. As noted above, the wavenumber estimates may be obtained in any conventional manner.

If the velocity of the surface wavetrain is much lower than the velocities of the other wavetrains in the seismic data trace, and the estimated wavenumber, $\hat{k}_s(f)$, is close to the actual wavenumber, $k_s(f)$, of the surface wavetrain, the spatial frequency (or wavenumber) of the first term in equation (2) will be much lower than the spatial frequencies of other events in the second term. By applying a spatial low-pass filter with a cutoff wavenumber which is on the order of $k_s(f)-\hat{k}_s(f)$ (note that $\hat{k}_s(f)-k_s(f)$ is much less than $k_m(f)-\hat{k}_s(f)$), the first term can be separated from the second term in equation (2) to obtain an estimate of the surface wavetrain, i.e., $$L\{S(x,f)e^{j\hat{k}_s(f)x}\}=A_s(f)e^{-j(k_s(f)-\hat{k}_s(f))x}, \qquad (3)$$

where L denotes the spatial low-pass filter. The separated surface wavetrain can be subtracted from equation (2) to obtain phase-shifted other wavetrains.

$$S(x,f)e^{jk_s(f)x} - L\{S(x,f)e^{jk_s(f)x}\} = \sum_m A_m(f)e^{-j(k_m(f)-k_s(f))x}. \quad (4)$$

Finally, the phase matching applied in step 14 is removed by multiplying the phase-matched other waves by $-\exp(j\hat{k}_s(f)x)$ to obtain $$e^{-j\hat{k}_s(f)x} \sum_m A_m(f)e^{-j(k_m(f)-\hat{k}_s(f))x} = \sum_m A_m(f)e^{-jk_m(f)x}, \quad (5)$$

which contains only the wavetrains other than the surface wavetrain. An inverse Fourier transformation may then be applied to return the seismic data traces to the time domain.

EXAMPLE

Figure 2:
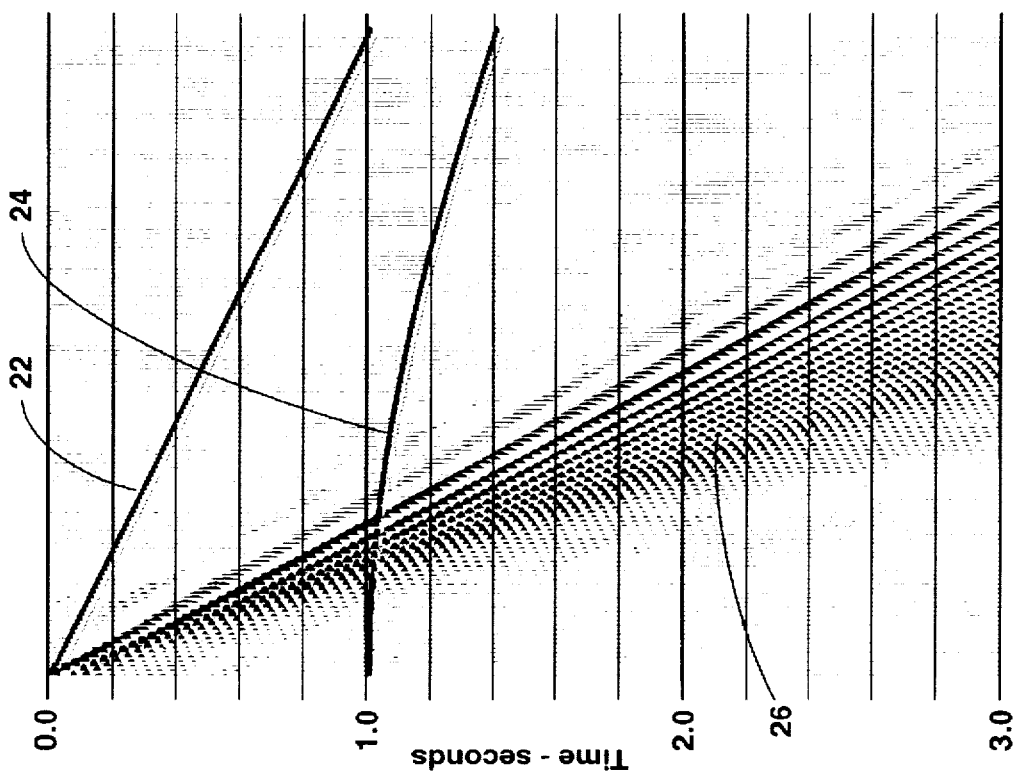

FIGS. 2 through 5 illustrate application of the present invention to a model data set. FIG. 2 is a time domain representation of the model data set. The trace spacing is 30 meters. There are three events. The first event is the direct arrival 22 (the linear event beginning at 0.0 seconds) with a velocity of 4300 meters per second; the second event is a seismic reflection 24 (the hyperbolic event beginning at 1.0 seconds) with a velocity of 4400 meters per second; and the third event is a dispersive wavetrain 26 with a frequency-dependent velocity function. The velocity of the dispersive wavetrain 26 is 1200 meters per second at a frequency of 5 Hertz, 900 meters per second at a frequency of 25 Hertz, and linearly prorated between these end points. The dispersive wavetrain was generated in the frequency domain by applying a phase shift to the frequency components between 5 and 25 Hertz at each seismic receiver location.

Figure 3:
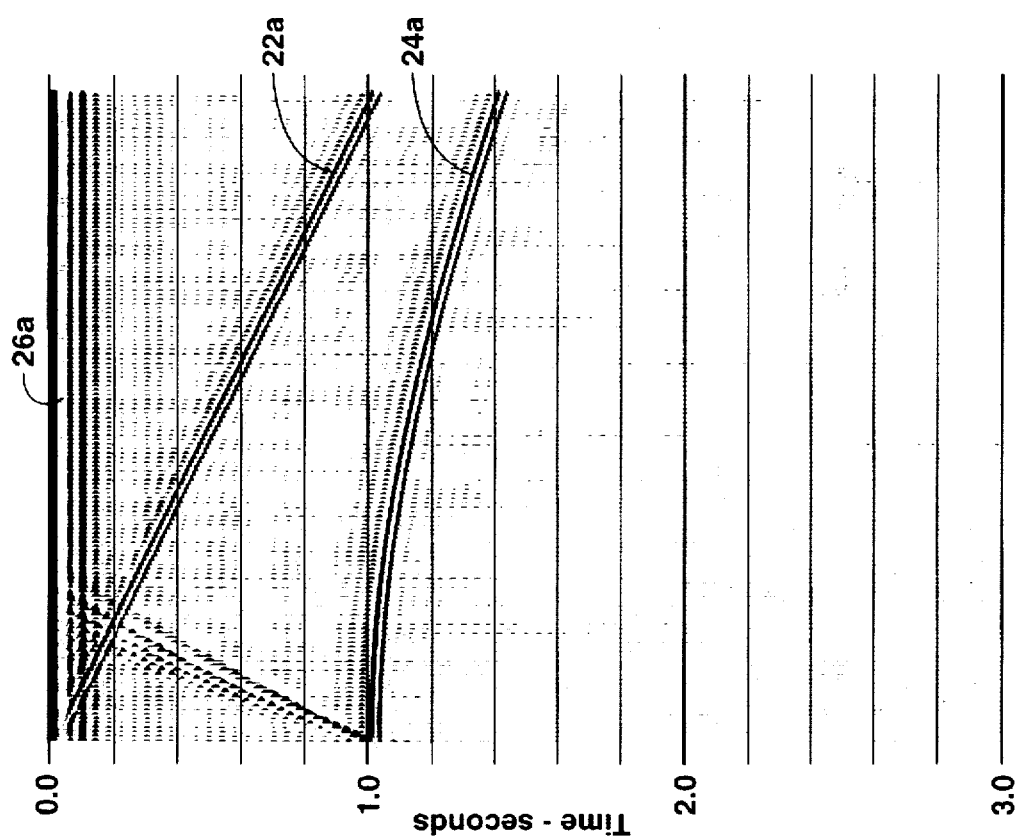

FIG. 3 is a time domain representation of the result of phase matching in the frequency domain with the correct dispersion relation. As expected, the dispersive wavetrains 26a are compressed and shifted to the time origin. However, note that the same frequency components in the linear direct arrival 22a and the hyperbolic seismic reflection 24a are also shifted in time, overlapping with the phase-matched dispersive wavetrains. Thus, simply zeroing the data samples near the time origin would remove these frequency components from the other events.

The wavenumber (or spatial frequency) of the dispersive wavetrain after phase matching is much lower (zero with the exact phase matching) than the wavenumbers of the other events in the same frequency band. The phase-matched dispersive wavetrains can be easily separated and removed from the other events by applying a spatial low-pass filter to each frequency component. FIG. 4 is a time domain representation of the result after the removal of the phase-matched wavetrain using a spatial low-pass filter spanning over 11 traces. Only the phase-shifted linear direct arrival 22a and the phase-shifted hyperbolic seismic reflection 24a remain.

The final steps of the inventive method are to remove the phase matching from the seismic data traces and to perform an inverse Fourier transformation to return the seismic data traces to the time domain. FIG. 5 displays the result of these steps. The dispersive wavetrain (see FIG. 2) has been completely removed while the amplitude and phase of the linear direct arrival 22 and the hyperbolic seismic reflection 24 appear the same as in the original data.

Persons skilled in the art will understand that the invention described above may be used to remove any type of source-generated, dispersive surface wavetrain from a set of seismic data traces. It should be understood that the invention is not to be unduly limited to the foregoing which has been set forth for illustrative purposes. Various modifications and alternatives will be apparent to those skilled in the art without departing from the true scope of the invention, as defined in the appended claims.

What is claimed is:

1. A method for attenuating a source-generated surface wavetrain in a set of common-source prestack seismic data traces, said method comprising the steps of:

a. performing a Fourier transformation of said seismic data traces with respect to time to determine the frequency components of said surface wavetrain;

b. estimating the wavenumber for each of said frequency components of said surface wavetrain;

c. using said wavenumber estimates to perform a phase matching operation to approximately align said surface wavetrain in said seismic data traces;

d. applying a spatial low-pass filter to remove said approximately aligned surface wavetrain;

e. removing said phase matching from said seismic data traces; and f. performing an inverse Fourier transformation to return said seismic data traces to the time domain.

2. The method of claim 1, wherein said wavenumber estimates are obtained from the slopes of said source-generated surface wavetrain in a common-source gather of said prestack seismic data traces.

3. The method of claim 1, wherein said wavenumber estimates are obtained from an f-k diagram of a common-source gather of said prestack seismic data traces.

4. The method of claim 1, wherein said Fourier transformation is performed according to the following equation:

$$S(x,f) = A_s(f)e^{-jk_s(f)x} + \sum_m A_m(f)e^{-jk_m(f)x},$$

where

S(x,f) is the Fourier transform with respect to time of a seismic data trace recorded by a seismic receiver at x;

f denotes frequency;

$A_s(f)$ is the amplitude of the surface wavetrain at frequency f, $A_m(f)$ is the amplitude of the mth other wavetrain at frequency f, j equals $\sqrt{-1}$;

$k_s(f)$ is the wavenumber of the surface wavetrain at frequency f, and $k_m(f)$ is the wavenumber of the mth other wavetrain at frequency f.

5. The method of claim 4, wherein said phase matching operation is performed by multiplying equation (1) by $\exp(j\hat{k}_s(f)x)$ to obtain $$S(x,f)e^{j\hat{k}_s(f)x} = A_s(f)e^{-j(k_s(f)-\hat{k}_s(f))x} + \sum_m A_m(f)e^{-j(k_m(f)-\hat{k}_s(f))x},$$

where $\hat{k}_s(f)$ is the estimated wavenumber of said surface wavetrain at frequency f.

6. The method of claim 5, wherein said spatial low-pass filter L has a cutoff wavenumber greater than $(k_s(f)-\hat{k}_s(f))$ but less than $(k_m(f)-\hat{k}_s(f))$ so that $$L\{S(x,f)e^{jk_s(f)x}\} = A_s(f)e^{-j(k_s(f)-\hat{k}_s(f))x},$$

and $$S(x,f)e^{jk_s(f)x} - L\{S(x,f)e^{jk_s(f)x}\} = \sum_m A_m(f)e^{-j(k_m(f)-\hat{k}_s(f))x},$$

where $S(x,f)e^{jk_s(f)x}$ represents the phase-matched Fourier transform of the seismic data traces; $L\{S(x,f)e^{jk_s(f)x}\}$ represents application of said spatial low-pass filter to the phase-matched Fourier transform of the seismic data traces; $A_s(f)e^{-j(k_s(f)-\hat{k}_s(f))x}$ represents the phase-matched surface wavetrain; and $$\sum_m A_m(f)e^{-j(k_m(f)-\hat{k}_s(f))x}$$

represents the phase-shifted other wavetrains.

7. The method of claim 6, wherein said phase matching is removed by multiplying the phase-shifted other wavetrains by $-\exp(j\hat{k}_s(f)x)$ to give $$e^{-j\hat{k}_s(f)x} \sum_m A_m(f)e^{-j(k_m(f)-\hat{k}_s(f))x} = \sum_m A_m(f)e^{-jk_m(f)x},$$

which contains only the wavetrains other than the surface wavetrain.

* * * * *

UNITED STATES PATENT AND TRADEMARK OFFICE
CERTIFICATE OF CORRECTION

PATENT NO. : 5,781,503
DATED : July 14, 1998
INVENTOR(S) : Young C. Kim

It is certified that error appears in the above-identified patent and that said Letters Patent is hereby corrected as shown below:

Columns 1-4 should be deleted and replace with columns 1-4, per attached pages.

Signed and Sealed this

Twelfth Day of December, 2000

Attest:

Q. TODD DICKINSON

*Attesting Officer*     *Director of Patents and Trademarks*

METHOD FOR ATTENUATING SURFACE WAVETRAINS IN SEISMIC DATA

FIELD OF THE INVENTION

This invention relates generally to the field of seismic prospecting and, more particularly, to seismic data processing. Specifically, the invention is a method for using a modified phase-matched filter to attenuate source-generated surface wavetrains in seismic data.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a seismic signal which propagates into the earth and is at least partially reflected by subsurface seismic reflectors (i.e., interfaces between underground formations having different elastic properties). The reflected signals (known as "seismic reflections") are detected and recorded by seismic receivers located at or near the surface of the earth, in an overlying body of water, or at known depths in boreholes, and the resulting seismic data may be processed to yield information relating to the subsurface formations.

Seismic prospecting consists of three separate stages: data acquisition, data processing, and data interpretation. The success of a seismic prospecting operation depends on satisfactory completion of all three stages.

The seismic energy recorded by each seismic receiver during the data acquisition stage is known as a "seismic data trace." Seismic data traces typically contain both the desired seismic reflections and one or more unwanted noise components which can obscure or overwhelm the seismic reflections. One of the primary objectives of the data processing stage is to remove or at least attenuate these unwanted noise components so that the desired seismic reflections can be clearly identified and interpreted.

Many different types of noise, both random and coherent, may be contained in a seismic data trace. Random noise is seismic energy which does not correlate between distinct seismic data traces. Coherent noise, on the other hand, is noise which has a systematic correlation between adjacent seismic data traces. As is well known in the art, random noise and, in many cases, coherent noise may be attenuated through the stacking process.

One type of coherent noise which may be contained in a seismic data trace is source-generated surface wavetrains, such as ground roll or ice-flexural waves. These source-generated surface wavetrains are recorded in seismic data traces as high-amplitude, low-frequency dispersive wavetrains. As is well know to persons skilled in the art, dispersive wavetrains are those in which each frequency component travels at a different velocity. A dispersive wavetrain is characterized by a "dispersion relation" which is the relationship between wavenumber and frequency for the wavetrain. As used herein, the "wavenumber" of a wavetrain is $2\pi$ times the number of cycles per unit distance measured perpendicular to the wavefront.

Because the seismic velocities of source-generated surface wavetrains are typically much slower than those of the desired seismic reflections, the stacking process often can be used to suppress surface wavetrains in stacked data. However, there is a need for a method to attenuate surface wavetrains in prestack data so that more accurate estimates of seismic velocities and static corrections can be obtained.

Accurate estimates of seismic velocities and static corrections are critical to obtaining high-quality images of the subsurface.

High-pass filters (i.e., filters that pass frequencies above some cutoff frequency without significant attenuation, while attenuating lower frequencies) can sometimes be used to remove surface wavetrains from prestack seismic data traces. High-pass filtering is effective as long as the frequencies of the surface wavetrains do not overlap with those of the desired seismic reflections. If the frequencies are overlapped, however, high-pass filtering also suppresses the low-frequency components of the seismic reflections, resulting in the loss of valuable data.

Frequency-wavenumber (f-k) filtering is another approach which can sometimes be used to remove surface wavetrains from prestack seismic data. However, since surface wavetrains are typically very slow, some of their wavelengths may be smaller than a typical station spacing, resulting in spatial aliasing in the f-k domain. This spatial aliasing makes f-k filtering less effective. Furthermore, three-dimensional (3-D) seismic data, especially 3-D land seismic data, are usually not amenable to Fourier transform techniques, such as f-k filtering, which require uniform sampling intervals.

Phase-matched filtering may be used to attenuate surface wavetrains in prestack seismic data traces by compressing and separating them from the desired seismic reflections.

Phase-matched filtering applies phase matching to a trace using the dispersion relation of the surface wavetrain so that the effects of propagation from the source location to each receiver location are removed. As a result of the phase matching, the surface wavetrain in each seismic data trace is compressed and shifted to the time origin. The compressed and shifted surface wavetrain can then be removed by zeroing the data samples in a small window at the time origin.

However, conventional phase-matched filtering techniques are often ineffective for the suppression of source-generated surface wavetrains in seismic data. For example, ground roll is often continuously generated after the shot is activated or is later generated by air blasts from the shot. For these types of ground roll, phase matching cannot shift the compressed wavetrain to the time origin unless the exact time when the ground roll was generated is known. Moreover, seismic reflections overlapping in time with surface wavetrains will be shifted to the time origin together with the surface wavetrains. Zeroing data samples in a small window will also remove these desired seismic reflections. In addition, adaptive iteration, which is used to determine the dispersion relation for conventional phase-matched filtering, may fail to converge if there are multiple modes of surface wavetrains.

Accordingly, there is a need for a reliable method for removing or attenuating ground roll and other source-generated surface wavetrains in prestack seismic data, which method is not subject to the problems of prior art methods described above. The present invention satisfies this need.

SUMMARY OF THE INVENTION

In one embodiment, the invention is a method for attenuating a source-generated surface wavetrain in a set of common-source prestack seismic data traces which comprises the steps of (a) performing a Fourier transformation of the seismic data traces with respect to time to determine the frequency components of the surface wavetrain, (b) estimating the wavenumber for each of the frequency components of the surface wavetrain, (c) using the wavenumber estimates to perform a phase-matching operation to approximately align the surface wavetrain in the seismic data traces, (d) applying a spatial low-pass filter to remove the approximately aligned surface wavetrain, (e) removing the phase-matching from the seismic data traces, and (f) performing an inverse Fourier transformation to return the seismic data traces to the time domain. The wavenumber estimates for the surface wavetrain may be obtained in any conventional manner, such as from the slopes of the source-generated surface wavetrain in a common-source gather of the prestack seismic data traces (each frequency component of a dispersive wavetrain has a different slope) or from the f-k diagram of a common-source gather of the prestack seismic data traces.

BRIEF DESCRIPTION OF THE DRAWINGS

The present invention and its advantages will be better understood by referring to the following detailed description and the attached drawings in which:

FIG. 1 is a flow chart showing the primary steps of one embodiment of the present invention;

FIGS. 2 through 5 illustrate application of the inventive method to a model data set;

FIG. 2 is a time domain representation of the original data set which contains a linear direct arrival, a hyperbolic seismic reflection, and a dispersive wavetrain;

FIG. 3 is a time domain representation of the result of phase matching in the frequency domain with the correct dispersion relation;

FIG. 4 is a time domain representation of the result after the removal of the phase-matched surface wavetrain using a spatial low-pass filter; and FIG. 5 is a time domain representation of the final results after removal of the phase matching.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method for attenuating a source-generated, dispersive surface wavetrain, even if there are multiple modes, in a set of prestack seismic data traces. The inventive method exploits the fact that the propagation velocity of the surface wavetrain is generally much lower than that of the desired seismic reflections to separate and remove the surface wavetrain from the seismic data traces.

The inventive method is preferably performed on a suitably programmed digital computer. Persons of ordinary skill in the art of seismic data processing could easily develop computer software for performing the method based on the teachings set forth herein.

FIG. 1 is a flow diagram for one embodiment of the inventive method. At step 10, the seismic data traces are Fourier transformed with respect to time to determine the frequency components of the seismic data traces. Next, at step 12, the wavenumber for each frequency component of the surface wavetrain is estimated, as more fully described below. At step 14, the wavenumber estimates are used to perform a phase matching operation to approximately align the surface wavetrain in the seismic data traces. A spatial low-pass filter is then applied, at step 16, to remove the approximately aligned surface wavetrain. Finally, at steps 18 and 20, the phase matching is removed and an inverse Fourier transformation is performed to return the seismic data traces to the time domain. The result of this process is a set of seismic data traces from which the source-generated surface wavetrain has been removed or at least substantially attenuated.

The wavenumber estimates used in step 12 may be obtained in any conventional manner, such as from the slopes of the surface wavetrain in a shot record or from the f-k diagram of a shot record. The wavenumbers used in the present method need not be precise; approximate estimates of the wavenumbers will suffice.

The mathematical basis for the present invention will now be described. A Fourier transformation of a seismic data trace containing both a dispersive surface wavetrain and other wavetrains can be expressed as a sum of wavetrains.

$$S(x,f) = A_s(f)e^{-jk_s(f)x} + \sum_m A_m(f)e^{-jk_m(f)x}, \quad (1)$$

where $S(x,f)$ is the Fourier transform with respect to time of a seismic data trace recorded by a seismic receiver at x;

f denotes frequency;

$A_s(f)$ is the amplitude of the surface wavetrain at frequency f;

$A_m(f)$ is the amplitude of the mth other wavetrain at frequency f;

j equals $\sqrt{-1}$;

$k_s(f)$ is the wavenumber of the surface wavetrain at frequency f; and $k_m(f)$ is the wavenumber of the mth other wavetrain at frequency f.

In equation (1), the first term (the "$A_s$" term) represents the surface wavetrain with dispersion relation $k_s(f)$, i.e., a functional dependence of wavenumber on frequency, and the second term (the "$A_m$" summation) represents all other wavetrains in the seismic data trace.

Phase matching (step 14 in FIG. 1) is performed with an estimated wavenumber, $\hat{k}_s(f)$, by multiplying equation (1) by $\exp(j\hat{k}_s(f)x)$, i.e., $$S(x,f)e^{j\hat{k}_s(f)x} = A_s(f)e^{-j(k_s(f)-\hat{k}_s(f))x} + \sum_m A_m(f)e^{-j(k_m(f)-\hat{k}_s(f))x}, \quad (2)$$

where $\hat{k}_s(f)$ is the estimated wavenumber of the surface wavetrain at frequency f. As noted above, the wavenumber estimates may be obtained in any conventional manner.

If the velocity of the surface wavetrain is much lower than the velocities of the other wavetrains in the seismic data trace, and the estimated wavenumber, $\hat{k}_s(f)$, is close to the actual wavenumber, $k_s(f)$, of the surface wavetrain, the spatial frequency (or wavenumber) of the first term in equation (2) will be much lower than the spatial frequencies of other events in the second term. By applying a spatial low-pass filter with a cutoff wavenumber which is on the order of $k_s(f)-\hat{k}_s(f)$ (note that $k_s(f)-\hat{k}_s(f)$ is much less than $k_m(f)-\hat{k}_s(f)$), the first term can be separated from the second term in equation (2) to obtain an estimate of the surface wavetrain, i.e., $$L\{S(x,f)e^{j\hat{k}_s(f)x}\} = A_s(f)e^{-j(k_s(f)-\hat{k}_s(f))x}, \quad (3)$$

where L denotes the spatial low-pass filter. The separated surface wavetrain can be subtracted from equation (2) to